F. A. DELABARRE.
ADJUSTABLE DENTAL MODEL.
APPLICATION FILED AUG. 19, 1915.

1,205,437.

Patented Nov. 21, 1916.
5 SHEETS—SHEET 1.

Fig.1.

Witnesses
Philip E. Barnes
J.J. Mawhinney

Inventor
Frank A. Delabarre
By Meyer Cushman
Attorney

UNITED STATES PATENT OFFICE.

FRANK A. DELABARRE, OF BOSTON, MASSACHUSETTS.

ADJUSTABLE DENTAL MODEL.

1,205,437.  Specification of Letters Patent.  Patented Nov. 21, 1916.

Application filed August 19, 1915. Serial No. 46,325.

*To all whom it may concern:*

Be it known that I, FRANK A. DELABARRE, a citizen of the United States, residing at Boston, in the county of Suffolk, and State of Massachusetts, have invented new and useful Improvements in Adjustable Dental Models, of which the following is a specification.

This invention relates to an adjustable dental model or apparatus simulating the human jaws, and is adapted to support correspondingly proportioned model teeth *in situ* as nearly as possible to the various types of natural human growths of teeth.

The invention is designed for demonstrating in class or lecture room, or for studying and demonstrating in private, all branches of dentistry; and is particularly adapted to illustrate the principles of normal occlusion of the human teeth, and the classification of mal-occlusion together with the steps that are necessary to undertake in orthodontic procedure to correct mal-occlusion.

Although the present invention is particularly well adapted to illustrate the above principles, it is also designed to illustrate principles involved in other branches of dentistry, such as crown and bridge work, operative and prosthetic work and the like; and to also admit of the practical demonstrating of the technique of making and applying the various forms of apparatus and artificial substitutes used in the different fields of dentistry, the apparatus and substitutes being of a size and form proportionate to the size of the model being used.

A further object of the invention is to provide a model or apparatus by means of which may be demonstrated all of the principles of dentistry involving anatomical or mechanical characteristics, and wherein the model teeth may be quickly and easily adjusted in any direction or position within the limits of possible occurrence in nature.

An important characteristic of this invention is to provide a main support for the upper jaw which admits of the swinging of the upper jaw outwardly so that an unobstructed plan view of either jaw may be had to observe the locations and arrangements of the teeth; to provide a socket at either side of the support, in the form of the natural glenoid fossa of the human skull, and to connect the lower jaws to the support by arms, similar in form to the natural rami, seated at their upper ends in the sockets and having all of the natural movements of the human jaw; and to provide an adjustable mounting for the sockets or support admitting of the adjustment of the depth of the sockets to change the path of the lower jaws and the parts carried thereby to correspond to the various forms and functionings found in the various human jaws.

Other objects and advantages of this invention will be clearly brought out in the following specific disclosure of the present embodiment of this invention, such disclosure being shown in the accompanying drawings wherein,—

Figure 1:
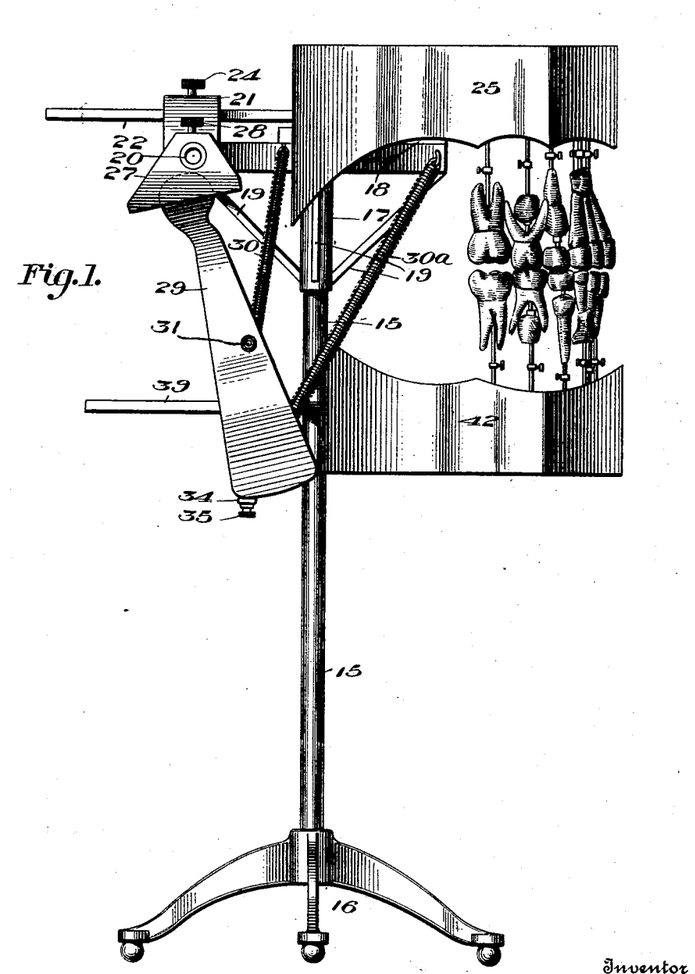
Figure 1 is a side elevation of the improved dental model.

Referring to these drawings, wherein like parts are designated by similar characters of reference throughout the several views, and more particularly to Fig. 1, the model or apparatus is mounted upon a suitable standard 15 of any desired configuration. The standard 15 is supported upon a base 16 shown in the present instance as comprising a plurality of legs radiating from the lower end of the standard 15.

Figure 2:
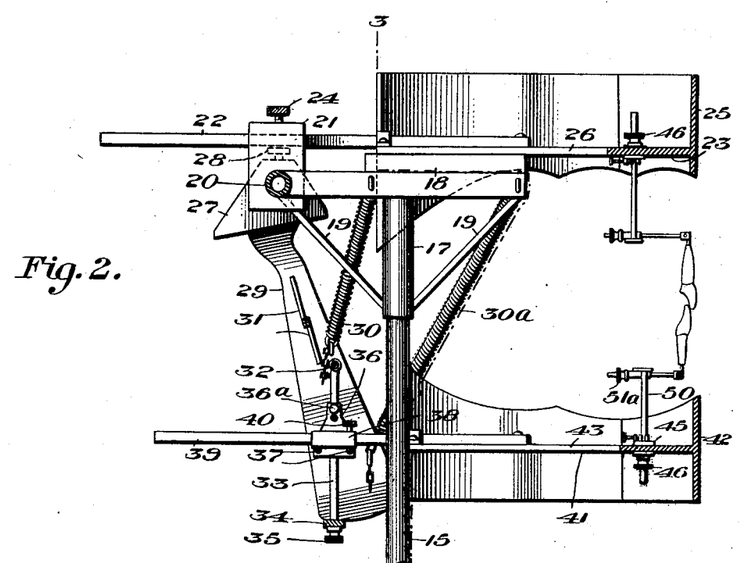
Fig. 2 is a detail enlarged vertical section taken longitudinally and centrally through the model.
Figure 3:
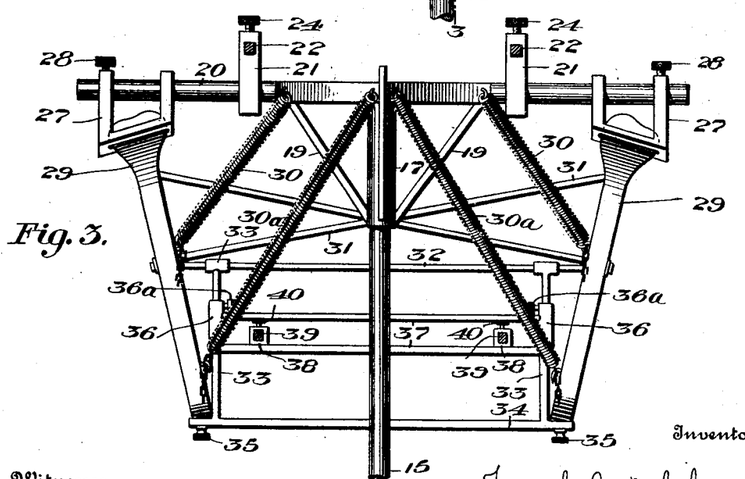
Fig. 3 is a vertical sectional view taken transversely through the model immediately behind the jaws, and on the line 3—3 of Fig. 2.
Figure 4:
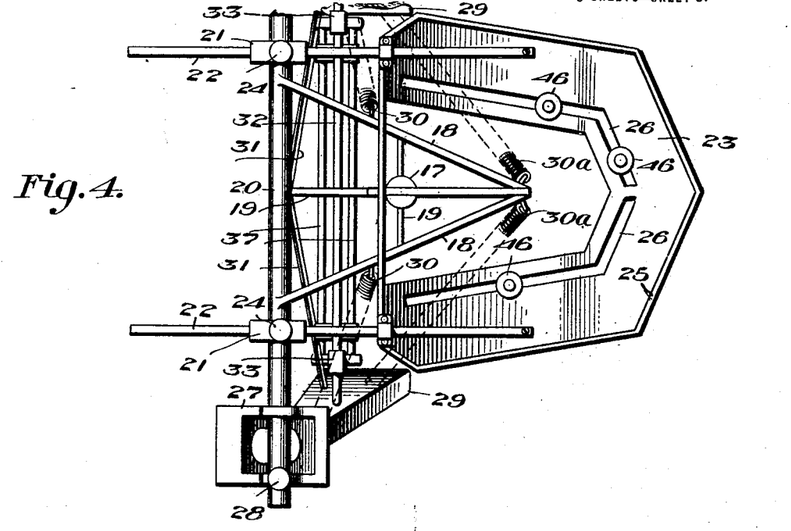
Fig. 4 is a top plan view of the model, the left side of the same being partly broken away.
Figure 5:
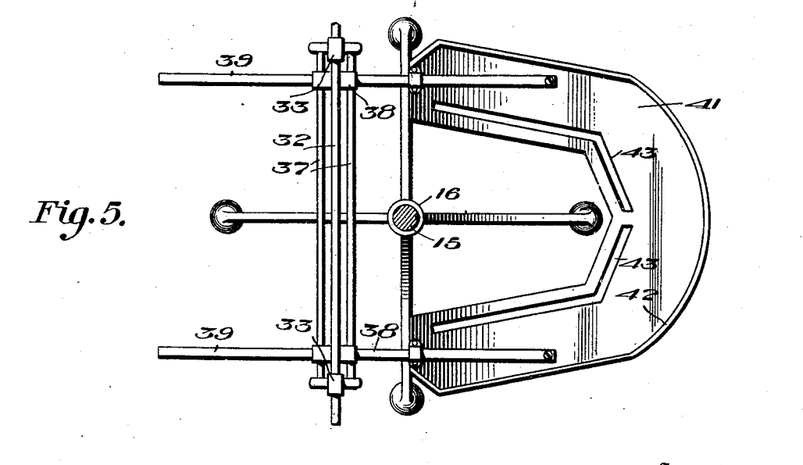
Fig. 5 is a horizontal section of the model taken immediately above the lower jaw and looking down upon the same.

The model, as shown in Figs. 1, 2 and 3, comprises a main frame having a tubular socket or sleeve 17 fitting over the upper end of the standard 15 and adapted for rotation thereupon. A horizontally disposed frame 18 is carried upon the socket 17 and is secured rigidly thereto by brackets 19 radiating from the socket, being inclined toward the frame 18 and having their ends secured to the frame 18.

A transverse rod 20, preferably of tubular form, is secured across the rear edge of the frame 18 and projects laterally therebeyond, as may be seen from Fig. 3. The rod 20 carries a pair of collars 21, located preferably adjacent to and one at either side of the plate 18, the collars 21 being adapted for turning movement upon the rod 20.

The collars 21 are provided with projections at one side thereof having openings therein for the reception of a pair of arms 22 which carry the upper jaw 23 as hereinafter described.

Set screws 24 are carried by the collars 21 for engagement with the arms 22 to secure the same in various adjusted positions.

The upper jaw 23 comprises a horizontal bed plate having about its edge a flange or skirt 25, the major portion of which projects upwardly from the bed plate and which has its lower edge trimmed in the usual manner. The plate 23 is provided near each side with a slot 26, which slots converge forwardly and are curved inwardly toward one another at the front of the plate substantially following the lines of a row of teeth.

Upon the rod 20 there is also positioned, near the outer extremities thereof, a pair of sockets 27 simulating the glenoid fossa of the human skull, which are adjustably mounted for longitudinal movement and rotation upon the rod 20, and adapted to be secured in various adjusted positions by set screws 28. The sockets 27 carry the inner enlarged ends of a pair of arms 29 simulating the rami of the human jaw, and which are yieldingly held in position by springs 30 and 30$^a$ having their upper ends fixed to the frame 18 in spaced relation and having their lower ends preferably adjustably secured in spaced relation to the lower portions of the arms 29. The springs 30 and 30$^a$ normally urge the arms 29 upward and thus tend to normally close the jaws.

Braces 31 connect the arms 29 and hold the same together so as to cause the arms 29 to move as a unitary structure. A bar 32, preferably circular in cross section, has its ends secured to the arms 29, extends across the space between the arms and hingedly carries thereon a pair of guides 33, the opposite ends of which are connected by a cross-piece 34; the bar 32, the guides 33, and the cross-piece 34 constituting a secondary frame. The cross piece 34 is preferably flat and has its ends projecting laterally beyond the arms 33 for sliding engagement beneath the outer ends of the arms 29. As may be best seen from Fig. 2, the arms 29 are enlarged and rounded at their outer ends so as to present a smooth surface, the curvature of which follows an arc having its center substantially in the bar 32 to admit swinging of the secondary frame between the arms 29. Binding screws 35 are carried on the outer ends of the cross-piece 34, in line with the arms 29, and are adapted for binding engagement against the curved outer ends of the arms 29 to thus hold the secondary frame in the desired angle of adjustment with respect to the arms 29.

Sleeves 36 are mounted to slide longitudinally on the guides 33 and are held in adjusted position thereon by set screws 36$^a$ as shown, or the like. The sleeves 36 carry cross stays or braces 37 connecting the sleeves to cause the same to move together as a unit. The stays or braces 37 carry spaced apart sockets 38 receiving rearwardly extending arms 39 which carry the lower jaw 41 hereinafter specifically described. The sockets 38 are provided with set screws 40 for engagement with the arms 39 to hold the same in various adjusted positions. By this arrangement it is thus observed that the lower jaw 41 may be adjusted into various angles with respect to the arms 29 to conform the jaw to any abnormality found in the natural jaw, so that the results produced by such abnormal position of the jaw may be accurately and carefully studied by the use of this invention.

The lower jaw 41 comprises a horizontal plate provided with a flange or skirt 42 about its edge, and with curved slots 43 as in the manner of the upper jaw 23 above described.

Each of the jaws 23 and 41 may be placed in any desired relation to each other by changing the various horizontal, vertical and angular adjustments, and are adapted to carry their respective sets of upper and lower teeth, and are also adapted to illustrate not only the various positions in which teeth are found naturally, but to also show the relative positions of the temporary or deciduous teeth, and the relative positions of the permanent teeth prior to the displacement of the temporary teeth. In order to support therefore the two sets of upper and lower teeth the following novel construction of support is utilized:—Within the respective slots 26 and 43 of the upper and lower jaws 23 and 41 are detachably positioned series of tubular sockets 44 having annular flanges 45 upon their outer ends for seating against the inner surfaces of the jaw plates and being externally threaded at their inner ends for the reception of retaining knurled nuts 46 adapted to bind against the outer surfaces of the jaw plates and to thus secure the sockets 44 in position. The sockets 44 are adapted for adjustment longitudinally of the slots 26 and 43 and are preferably held against rotation in the slots by lateral stops or shoulders 44$^a$ engaging against the walls of the slots. The outer end of each socket 44 is provided with a circumferential spring tongue 47, formed preferably by an L-shape slit in the outer end of the socket. The tongues 47 are urged inwardly by set screws 48 threaded into projections 49 on one side of the flanges 45.

Slidably engaging through each of the sockets 44 is a tube 50, the upper end of which is provided at one side with a horizontal socket 51 slidably receiving an arm 52 upon the outer end of which is adjustably supported a pin 53. The socket 51 is preferably cylindrical in form, externally threaded and split at one end, and is provided with a conical binding nut 51$^a$ on said end adapted to contract the split end of the socket upon the arm 52 to hold it yieldingly from turning and from longitudinal movement in the socket.

Figures 6, 7, 8, 12:
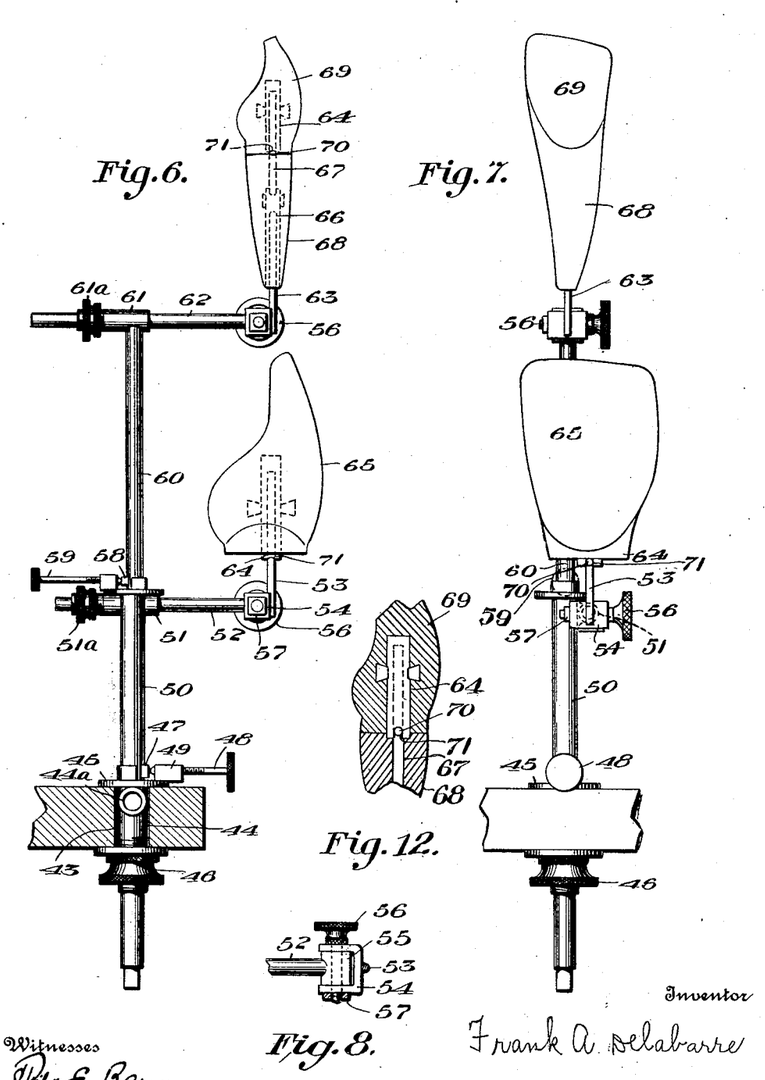
Fig. 6 is a side elevation, enlarged, of one of the teeth supports.
Fig. 7 is a front elevation of the same.
Fig. 8 is a detail view of one of the adjustable knuckles employed in the support shown in Figs. 6 and 7.
Fig. 12 is a cross sectional view of the tooth and tooth support shown in Fig. 6 to illustrate the connection between the tooth and the root.

The pin 53 is secured at its lower end, as may be best seen at Fig. 8, to a yoke 54, the opposite ends of which bear against the opposite sides of a head 55 carried upon the outer end of the arm 52 and through which passes a binding screw 56. The binding screw 56 is adapted to pass through the head 55 and through the opposite ends of the yoke 54, and by means of a nut 57, bind the opposite ends of the yoke against the opposite sides of the head and support the pin 53 in the desired angular position.

The tube 50 has on its upper end a second spring tongue 58 controlled by a set screw 59 for frictional contact against the outer surface of a rod 60 telescoping into the tube 50. A socket 61 is carried upon the outer end of the rod 60 and has adjustably secured therein, by means of a conical nut 61$^a$, as above described, an arm 62 upon the outer end of which is adjustably mounted a pin 63. The pin 63 is secured to the arm 62 by the knuckle connection shown in Fig. 8.

The pins 53 and 63 are adapted to support a tooth root, a tooth crown, or both, as shown in the lower part of Fig. 6, the pin 53 telescopes into a tube or seat 64, which is firmly embedded in the crown of a tooth 65, and is thus adapted to support the tooth in proper position. The pin 63, as shown in the upper part of Fig. 6, telescopes into a tube or seat 66, embedded in the root 68 of a tooth. The tube or seat 66 carries a pin 67 projecting upwardly through the root 68 and telescoping into the tube or seat 64 embedded in the crown of the tooth 69 as above described. It is thus seen that in the latter case the root 68 of a tooth is shown in position inwardly of the tooth 69 itself and to provide for such an arrangement the tube 66 and the pin 67 are provided. To hold the tooth 69 from turning upon the root 68, the pin 67 has lateral studs or projections 70 located substantially in the plane of the outer end of the root 68 and which engages in registering notches 71 formed in the opposite sides of the tube or seat 64.

From Fig. 6 it will be noted that the laterally extending projections 70 are provided only on the pin 67 to engage in the recesses 71 of the socket 64 and retain the tooth crown 69, or 65, from turning relatively to the tooth root 68. When the tooth crown is used without the tooth root 68, as shown at 65 in the lower part of Fig. 6, the projections 70 are not used to thus admit the turning of the tooth crown 65 into various angles as required.

It is of course understood that with these tubes and rods a large number of adjustments may be had by telescoping the rods into the tubes and by turning the rods around in their respective sockets and tubes. The friction tongues 47 and 58 are adapted to yieldingly hold the tube 50 and the rod 60 in position after the same have been manually turned in the desired adjusted position.

Figure 9:
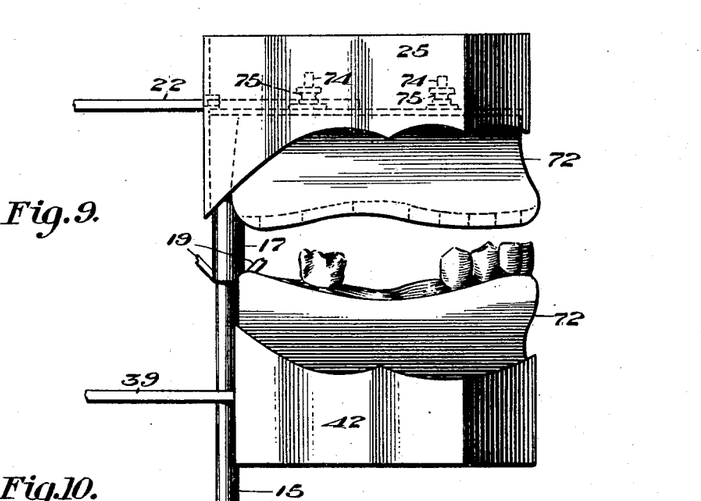
Fig. 9 is a side elevation of a pair of jaws having edentulous sections secured therein, the lower section having a row of teeth mounted thereon.
Figure 10:
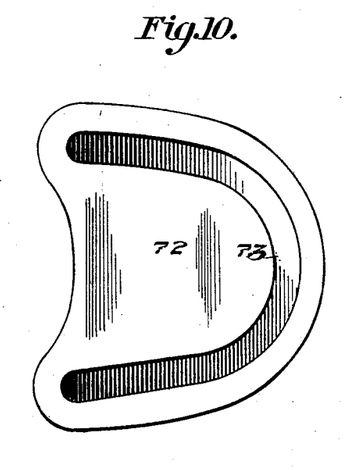
Fig. 10 is a detail view of the upper edentulous section.
Figure 11:
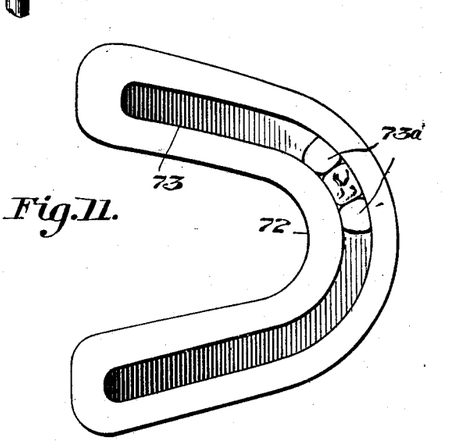
Fig. 11 is a similar view showing the lower edentulous section, and having filler blocks applied thereto.

When it is desired to demonstrate "plate" "crown" and "bridge" work edentulous sections 72 are preferably employed, and as shown in Figs. 9 and 10, comprise jaw sections resembling the upper and lower parts of the human jaws. These sections 72 have in their inner faces, and near the edges thereof, curved grooves or slots 73 following the curvature of a natural row of teeth as shown in Fig. 10 and into which one or more of the model teeth may be inserted. The grooves 73 are provided with pluralities or filler blocks 73$^a$ adapted to close the grooves about one or more of the teeth when the entire row of teeth is not desired. The teeth are packed in place by the well known "modeline" or molding clay used in the arts. The edentulous sections 72 are fastened in the jaws 23 and 41 by means of studs or projections 74 carried by the sections 72 and extending through the slots 26 and 43 of the respective upper and lower jaws. Thumb nuts 75 are threaded on the pins 74 and bind against the jaw plates to hold the sections 72 firmly in place.

It will be understood from the above description of the present preferred embodiment of the invention that the dental model is capable of practically every adjustment required to conform the model to practically any human jaw, and to any human growth of teeth; so that all abnormal conditions may be simulated, may be operated upon, and may be demonstrated and studied.

The above described model may be made in various sizes, and the various parts thereof may be modified as found desirable in the manufacture of the model, and to suit the various uses to which the device may be put.

As regards the edentulous sections above described, they may be made in any desired form or number of parts and are adapted to admit of the clear demonstration of "plate work" and "crown and bridge work" and have a surface of any suitable material which will preferably receive chalk or pencil marks. The model teeth may be mounted on the sections singly, in rows, or in any desired manner, and some suitable plastic material, such as the well known "modeline" or modeling clay may be molded around the model teeth to supply the missing parts and to impart a natural finish to the mounting.

It is of course understood that various changes may be made in the construction, size and materials of the dental model of this invention without departing from the spirit thereof, the same being limited only by the scope of the following claims.

What is claimed is,—

1. In a dental model, a jaw, a support carried by said jaw, and a tooth on said support in separated relation to said jaw.

2. In a dental model, a jaw, a plurality of independent tooth supports in said jaw, and teeth on said supports in separated relation to said jaw.

3. In a dental model, a jaw, adjustable supports in said jaw, and teeth on said supports.

4. In a dental model, a jaw, a plurality of independently adjustable tooth supports in said jaw, and teeth on said supports.

5. In a dental model, upper and lower jaws, tooth supports adjustable in said jaws, and teeth on said supports.

6. A dental model comprising an upper jaw, a lower jaw, adjustable means in each of said jaws for supporting upper and lower sets of teeth, and teeth on said adjustable supports.

7. In a dental model; a jaw; a plurality of independent teeth supports in said jaw; and a second plurality of independent adjustable teeth supports in said jaw.

8. A dental model comprising upper and lower jaws; teeth supports on the jaws; and means engaging said supports to hold the same in various adjusted positions.

9. In a dental model; upper and lower jaws; supports in said jaws adapted to support upper and lower sets of temporary teeth; and independent supports carried by said jaws for supporting upper and lower sets of permanent teeth.

10. In a dental model; upper and lower jaws; independent teeth supports detachably mounted in said jaws; and means for independently holding said supports in various adjusted positions.

11. In a dental model; upper and lower jaws; independent teeth supports in said jaws adapted to hold upper and lower sets of teeth *in situ;* and means for adjustably holding said supports in various adjusted positions corresponding to normal and abnormal natural growths.

12. A dental model comprising upper and lower jaws; teeth supports in said jaws adapted to hold upper and lower sets of teeth; and means on said supports admitting of the adjustment of said teeth out of their normal vertical plane.

13. In a dental model; a jaw; a support detachably and adjustably mounted in said jaw; and a secondary support adjustably mounted on said first support.

14. In a dental model; a jaw; a detachable and adjustable support mounted in the jaw adapted to carry a temporary tooth; and a secondary support adjustable in said jaw independently of said first support adapted to carry a permanent tooth.

15. In a dental model; upper and lower jaws; temporary teeth supports in said jaws; and independent permanent teeth supports in said jaws, said supports being independently adjustable whereby the relative positions of said temporary and permanent teeth may be adjusted as desired.

16. In a dental model; upper and lower jaws; temporary teeth supports in said jaws; permanent teeth supports in said jaws; and means for independently holding said supports in adjusted position whereby the temporary and permanent teeth may be independently adjusted to simulate the different stages of the natural occlusion of the temporary and permanent teeth.

17. In a dental model; an upper jaw; a lower jaw hinged to said upper jaw; and a plurality of independent teeth supports laterally and vertically adjustable in said jaws, said supports being detachable from said jaws whereby one or more teeth may be mounted in said jaws at a time.

18. In a dental model; an upper jaw; a lower jaw; and teeth supports in said jaws, said supports being adjustable in substantially all directions whereby said teeth may be moved into various relative positions corresponding to the various natural growths of teeth.

19. In a dental model; a jaw including a frame having a slot therein; a support engaging in said slot and adapted for securement to said frame in various adjusted positions throughout the length of the slot; and teeth engaging means adjustably mounted on said support.

20. In a dental model; a jaw including a frame having a slot therein extending in the line of a natural row of teeth; a plurality of independent teeth supports carried by said jaw and adjustable longitudinally in said slot; and means for detachably securing said supports in said plates.

21. In a dental model; a jaw including a frame; a plurality of supports adjustably and detachably secured to said frame; and teeth engaging means adjustably mounted on said supports.

22. In a dental model, a tooth support comprising telescoping members, a tooth-engaging pin mounted on one of said members, and adjustable means for holding said members and pin in various positions.

23. In a dental model; a jaw having a frame; a support adjustably mounted on said frame and adapted for adjustment vertically through the same; means for holding said support from rotation on said frame; and adjustable tooth engaging means on the outer end of said support.

24. In a dental model; upper and lower jaws; supports in said jaws for carrying upper and lower sets of teeth; said supports being adjustable into various heights and angles whereby to demonstrate natural abnormalities.

25. In a dental model; a tooth root; a pin on said root; a socket engaging over said pin and adapted to be embedded in a tooth crown; and a lateral stud on said pin, said socket having a notch in its lower end adapted to receive said pin to retain the crown from turning with respect to the root.

26. In a dental model; a tooth root; a pin on said root; a socket engaging over the pin; a stem rising from said socket; a second socket receiving said stem; and means on said stem and said second socket adapted to prevent the turning of the socket on the stem.

27. In a dental model; a support; a pin on the support; a socket engaging over said pin and adapted to be embedded in a tooth root; a stem rising from said socket through said tooth root; and a second socket engaging over said stem and adapted to be embedded in a tooth crown.

28. In a dental model; a pair of jaws; teeth supports mounted in the jaws; and connecting means for the jaws admitting of the upward swinging of the upper jaw whereby to disclose the interior of the jaws.

29. In a dental model, an upper jaw, a lower jaw hinged with respect to said upper jaw, a connection between said jaws to permit relative lateral movement of the jaws to simulate functional movements, and means for adjusting such connection to effect movement of the jaws relative to each other.

30. In a dental model; an upper jaw; a pair of arms pivoted to said upper jaw simulating the natural rami; and a lower jaw adjustably supported on said arms whereby said lower jaw may be adjusted into various angles on said arms to correspond to the various forms of the natural lower jaw.

31. In a dental model; upper and lower jaws; connecting means for the jaws admitting of the vertical and lateral adjustments of the jaws relative to one another; and independently adjustable teeth supports in said jaws admitting of the adjustment of said teeth in any relation to each other and to the said jaws.

32. In a dental model; upper and lower jaws; means for admitting of the relative adjustment of said jaws; and teeth supports in said jaws, said supports being adjustable whereby said teeth may be adjusted in any relation to each other and to the said jaws.

33. In a dental model; an upper jaw; a lower jaw pivoted upon said upper jaw; said lower jaw being adjustable whereby the same may be adjusted to various positions simulating the natural jaw; and teeth in said upper and lower jaws adapted for adjustment to correspond with the adjustments of said lower jaw.

34. In a dental model; an upper jaw; a lower jaw hinged to said upper jaw; adjusting means for said lower jaw; independent teeth supports in said upper jaw; independent teeth supports in said lower jaw; all of said supports being adjustable whereby said teeth may be adjusted into various positions corresponding to the relative adjustment of said jaws.

35. A dental model comprising a standard; a frame mounted for rotation on the upper end of the standard; a tube carried across said frame; an upper jaw adjustably mounted on said tube; a pair of depending arms adjustably mounted on said tube; a lower jaw adjustably secured to the lower ends of said arms; means for yieldingly holding said jaws closed; and a plurality of teeth supports in said jaws.

36. In a dental model; a standard; a tube adjustably supported on the upper end of said standard; an upper jaw adjustable in a horizontal plane upon said tube; a lower jaw hinged to said tube and adapted for horizontal, vertical, and angular adjustment; springs between said lower jaw and said tube adapted to normally urge said lower jaw in an upward direction; and teeth supports in said jaws.

37. In a dental model; a base; a standard rising from said base; a socket mounted for rotation upon the upper end of said standard; a frame mounted horizontally on the upper end of said socket; a tube extending across the rear edge of said frame and projecting beyond the ends thereof; collars adjustable upon said tube adjacent the ends of the frame; arms longitudinally adjustable upon said collars; an upper jaw secured to the outer ends of said arms; sockets adjustably mounted upon the ends of said tube; a pair of depending arms hinged to said sockets; a second frame adjustably mounted upon the lower ends of said arms; a lower jaw adjustably mounted on said second frame; and teeth supporting means in said jaws.

In testimony whereof I have hereunto set my hand in presence of two subscribing witnesses.

FRANK A. DELABARRE.

Witnesses:
FREDERICK A. RICHARDSON,
FRED H. LANGLEY.

Copies of this patent may be obtained for five cents each, by addressing the "Commissioner of Patents, Washington, D. C."